_United States Patent Office_ 3,096,340
Patented July 2, 1963

3,096,340
NEW PHTHALOCYANINE DYES
Arnold Tartter, Lambsheim, Pfalz, Werner Rohland, Ludwigshafen (Rhine), Dieter Ludsteck, Ludwigshafen (Rhine)-Gartenstadt, and Rudolf Schroedel, Ludwigshafen (Rhine), Germany, assignors to Badische Anilin- & Soda-Fabrik Aktiengesellschaft, Ludwigshafen (Rhine), Germany
No Drawing. Filed Oct. 10, 1960, Ser. No. 61,391
Claims priority, application Germany Oct. 15, 1959
4 Claims. (Cl. 260—314.5)

This invention relates to new phthalocyanine dyes, a process for their production and their use for dyeing textile materials.

It is an object of the present invention to provide new phthalocyanine dyes which dye leather and textile materials of wool, silk, synthetic linear polyamides and especially cellulose excellently fast to light and wet treatment. The term "textile materials" includes fibers, flock, threads, filaments, woven textiles and non-woven textiles. Especially suitable synthetic linear polyamides include nylon 6, nylon 66 and nylon 11. The term "cellulose" includes native cellulose, for example cotton, and regenerated cellulose, for example rayon and rayon staple.

The new phthalocyanine dyes of this invention have the general formula:

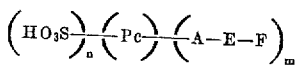

in which

Pc represents the radical of a metal-free or metalliferous phthalocyanine, a chlorphthalocyanine with 1 to 4 chlorine atoms in the molecule, a phenylphthalocyanine with 1 to 4 phenyl groups in the molecule, a phenylmercaptophthalocyanine with 1 to 4 phenylmercapto groups in the molecule or a phenylsulfonylphthalocyanine with 1 to 4 phenylsulfonyl groups in the molecule, and in which the said metalliferous phthalocyanine derivatives do not lose their metal when treated with concentrated sulfuric acid at room temperature, A represents one of the divalent radicals:

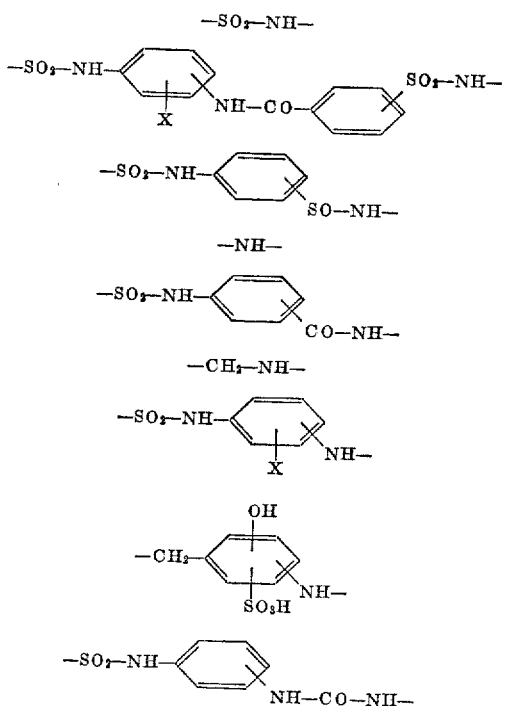

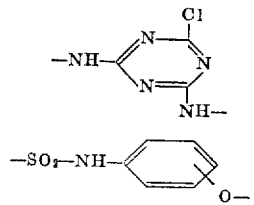

and

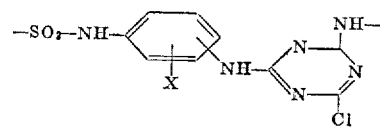

E represents one of the radicals

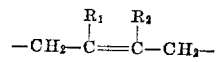

or

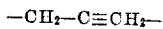

and

F represents a halogen atom, preferably a chlorine atom or a bromine atom or one of the radicals: —O—SO$_3$H,

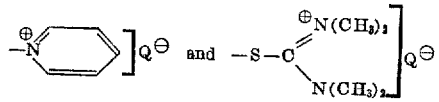

$n$ represents one of the numbers 0, 1, 2, 3 and 4, $m$ represents one of the numbers 1, 2, 3 and 4, X represents a hydrogen atom or a sulfonic acid radical, R$_1$ represents a hydrogen atom, chlorine atom, bromine atom or methyl radical, R$_2$ represents a hydrogen atom, chlorine atom, bromine atom or methyl radical, and Q represents a halogen atom, preferably a chlorine or bromine atom, or an HSO$_4$ group.

Metalliferous phthalocyanine derivatives which do not give off their metal when dissolved in concentrated sulfuric acid at room temperature are the phthalocyanine derivatives of copper, nickel, iron, cobalt, zinc, aluminum, chromium and molybdenum. The preferred dyes of this invention are derived from copper and nickel phthalocyanines.

The new dyes of this invention are present not only in the form of their free sulfonic acids, but also as salts, for example ammonium salts or alkali salts, such as sodium or potassium salts.

A further object of this invention is to provide a process for the production of the new phthalocyanine dyes of this invention.

New dyes of the Formula I in which F represents a halogen atom, preferably a chlorine atom or a bromine atom, or an —OSO$_3$H radical can be prepared for example by reacting one mol of a phthalocyanine derivative containing an amino group and having the general formula:

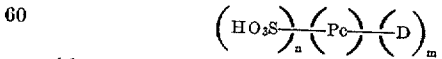

with $m$ mols of a compound of the general formula:

Y—E—Z    III in which Pc, E, $m$ and $n$ have the meanings given above, D represents one of the radicals: —NH$_2$, —CH$_2$—NH$_2$,

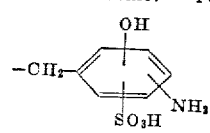

and

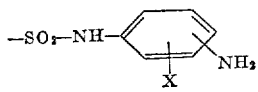

X having the meaning given above, Z represents a halogen atom, preferably a chlorine or bromine atom, or an —OSO₃H radical and
Y represents a chlorine or bromine atom or one of the radicals

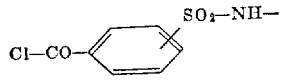

and

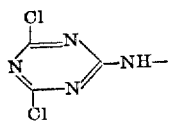

By further reaction of the reaction products thus obtained with pyridine or tetramethylthiourea, the new dyes of the Formula I are obtained in which F represents one of the radicals

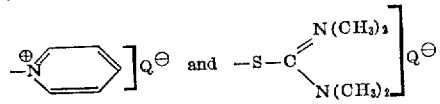

The conversion of the phthalocyanine dyes in question into those with quaternary ammonium or thiuronium groups is of special advantage when the initial materials are insoluble or only slightly soluble in water. By the introduction of the ammonium or thiuronium groups, the water-solubility of the phthalocyanine dyes is increased or brought about.

The reaction of phthalocyanine derivatives of the Formula II with compounds of Formula III is carried out for example in water or organic liquids or in mixtures of water and organic liquids, preferably in the presence of acid-binding substances, such as alkali hydroxides, carbonates, hydrogen carbonates and acetates.

Reaction of the reaction products with pyridine or tetramethylthiourea is carried out at room temperature or an elevated temperature, for example 50° to 100° C., with the coemployment of organic diluents, but preferably without diluent. The reaction products are then taken up in water and salted out or precipitated with organic diluents, as for example acetone.

A further possibility for preparing the new dyes of Formula I in which F represents a halogen atom or an —OSO₃H radical comprises reacting one mol of a phthalocyanine sulfonic acid halide of the general formula:

$$(Pc)\text{-}(SO_2Cl)_{(n+m)} \quad \text{IV}$$

with $m$ mols of an amine of the general formula:

$$H_2N\text{—}G\text{—}E\text{—}Z \quad V$$

and converting the sulfonic acid chloride radicals remaining in the reaction product into sulfonic acid radicals by hydrolysis. In Formulae IV and V, Pc, E, Z, $n$ and $m$ have the meanings given above and G represents a covalent linkage or one of the divalent radicals:

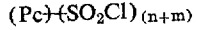
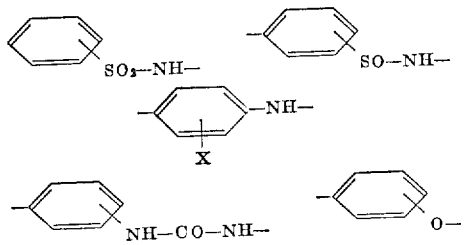

and

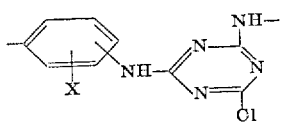

in which X has the meaning given above.

The reaction conditions are the same as for the reaction of compounds of Formula II with those of Formula III.

If the said reaction products are reacted with pyridine or tetramethylthiourea, further dyes of Formula I are obtained in which F represents one of the radicals:

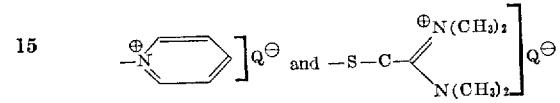

The reaction conditions here are chosen as above described.

As phthalocyanine derivatives containing amino groups and having the Formula II those compounds are preferred in which $n$ represents a number equal to or greater than 1, such as tetrakisamino copper phthalocyanine tetrasulfonic acid, bis-, tris- and tetrakis-aminomethyl copper phthalocyanine di-, tri- and tetrasulfonic acids, bis-(4-aminobenzoyl)-, bis-(4-aminophenylmercapto)- and bis-(4-aminophenylsulfonyl)-copper phthalocyanine sulfonic acids and the phthalocyanines obtained according to the process of British patent specification No. 827,569.

As phthalocyanine derivatives containing amino groups there are also suitable as initial materials the compounds obtained by reaction of tetrazaporphin sulfonic acid halides with aromatic diamino or higher polyamino compounds or aromatic nitroamino or aminoacylamino compounds, the second amino group in the case of nitroamino and aminoacylamino compounds being produced by reduction or saponification after reaction with the tetrazaporphin sulfonic acid halides.

Examples of compounds of the general Formula III are: 1,4-dichlorobutene-(2), 1,4-dichlorbutine-(2), 1,3,4-trichlorbutene-(2), 1,2,3,4-tetrachlorbutene-(2), 1,4-dibromobutene-(2) and 1,4-dibromobutine-(2). These compounds are already known. Further compounds of the Formula III include benzene-1-sulfonic acid-(4-chlorbutin-(2)-ylamide)-3-carboxylic acid chloride, benzene-1-sulfonic acid-(4-chlorbutin-(2)-ylamide)-4-carboxylic acid chloride and 2-(4-chlorbutin-(2)-ylamino-(1))-4,6-dichlor-1,3,5-triazine. The last-mentioned compound is obtained by reaction of equimolar amounts of cyanuric acid chloride and 1-amino-4-chlorbutine. The previously specified compounds are obtained by sulfochlorination of benzoic acid, reaction of the resultant sulfonic acid chloride with the corresponding amide and conversion of the reaction product into the corresponding carboxylic acid chloride.

Amines of the Formula V include 1-amino-4-chlorbutene-(2), 1-amino-4-chlorbutine-(2), 1-amino-3,4-dichlorbutene-(2), 1-amino-4-bromobutine-(2) and 1-amino-2,3-dimethyl-4-bromobutine-(2). The production of 1-amino-4-chlorbutine-(2) by reaction of 1,4-dichlorbutine-(2) with hexamethylene tetramine and subsequent treatment of the reaction product with methanolic hydrochloric acid is described in the periodical Comptes rendus hebd. des Séances de l'Académie des Sciences, volume 241 (1955), p. 752 et seq. The above-mentioned amino compounds are obtained in the same way from the corresponding halogen compounds. A detailed description of the procedure is given in Example 1 hereinafter. The amines of Formula V are decomposable in the free state; they are therefore preferably prepared and used in the form of their hydrochlorides or hydrobromides.

Further amino compounds of the Formula V include: 1-aminobenzene-4-sulfonic acid-(3,4-dichlorobuten-(2)-yl amide), 1-aminobenzene-3-sulfonic acid-(3,4-dichlorbuten-(2)-ylamide), 1-aminobenzene-4-sulfonic acid-(4-chlorbuten-(2)-ylamide), 1-aminobenzene-4-sulfonic acid-(4-chlorbutin-(2)-ylamide) and the halogen butenyl amides and halogen butinyl amides of 1-aminobenzene-4-carboxylic acid, 1-amino-3-chlor-4-methylbenzene-6-sulfonic acid, 1-amino-2,5-dichlorobenzene-4-sulfonic acid, 1-aminobenzene-2,4-, -2,5- and -2,6-disulfonic acid and 1-amino-2-methylbenzene-4,5- and 4,6-disulfonic acid. These amides may be prepared for example by reaction of acetylaminosulfonic acid halides with the amines specified in the preceding paragraph and subsequent splitting off of the acetyl group from the reaction products by means of hydrochloric acid. Further amines which may be used as initial materials can be prepared for example by reaction of equimolar amounts of amines specified in the preceding paragraph, 1,3-diaminobenzene-3- or -4-sulfonic acid and dihalogentriazine or dihalogenpyrimidine derivatives or by reaction of equimolar amounts of di- and higher poly-halogenbutenes or -butines with unilaterally acylated diamines and subsequent splitting off of the acyl groups from the reaction products. Suitable unilaterally acylated diamines include 1-acetylamino-3- and -4-aminobenzene and 1-acetylamino-3-aminobenzene-4-sulfonic acid.

The new dyes of Formula I may also be obtained by reacting for example one mol of a phthalocyanine derivative of the general formula:

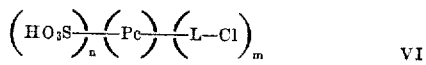

with $m$ moles of an amine of Formula V in which G represents a covalent linkage, Pc, $n$ and $m$ have the same meanings as above an L represents one of the radicals:

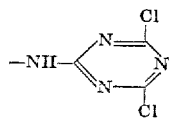

and

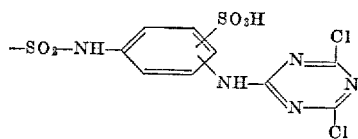

Compounds of the Formula VI include:

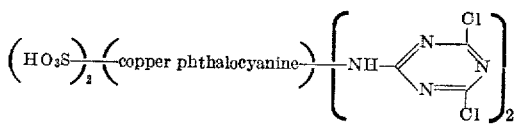

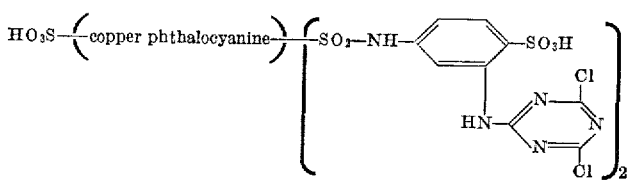

and

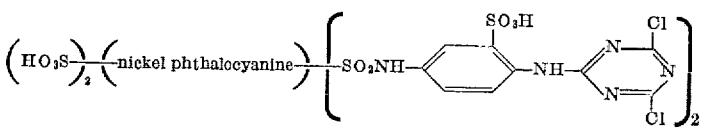

Instead of compounds of Formula VI it is also possible to use halides of carboxyarylaminophthalocyanines or sulfoarylaminophthalocyanines and the tetrazaporphin methylenethioalkyl and thioaryl carboxylic acids which can be prepared according to the process of U.S. patent specification No. 2,759,950.

The new dyes of this invention are suitable for dyeing or printing textile materials such as fibers, flock, fabrics (woven and knitted), fleeces, or molded articles of wool, silk, synthetic linear polyamides and leather, especially textile materials of natural or regenerated cellulose.

In dyeing with the new dyes, the procedure may be for example that materials of cellulose are padded with an aqueous solution of the new dyes and after drying led through an aqueous bath which contains basic-reacting agents, such as alkali hydroxides, carbonates or hydrogen carbonates, and possibly neutral salts, such as sodium chloride or sodium sulfate. The dyes are fixed on the material being dyed by steaming for a short time. Instead of steaming, a treatment with hot air at 50° to 150° C. may be used. The basic-reacting agents and possibly the neutral salts may also be added to the padding bath. It is also possible to treat for example cellulose materials with aqueous solutions of basic-reacting substances, pad them with the new dyes and then fix the dyes on the material.

In printing materials, for example of cellulose, the new dyes are advantageously applied together with usual thickening agents and basic-reacting substances, possibly with the usual printing auxiliaries, to the material to be printed, and the latter is dried and steamed for a short time. The fabric may also be printed with the new dyes and usual thickening agents, possibly together with usual printing auxiliaries, dried, led through a bath charged with the basic-reacting substances, then dried again and steamed. Finally the dyes may be printed together with the usual thickening agents onto a fabric which has been treated with basic-reacting substances, and then dried and steamed.

Dyeings and prints with excellent wet fastness are obtained by the said methods.

The following examples will further illustrate this invention but the invention is not restricted to these examples. The parts and percentages are by weight unless otherwise specified. Parts by volume bear the same relation to parts by weight as the liter to the kilogram under normal conditions.

*Example 1*

30 parts of the compound of the formula:

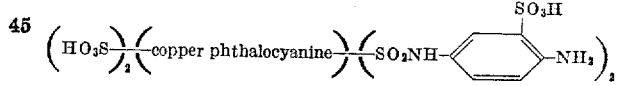

are made into a paste with water, the paste is mixed with 500 parts of methanol and such an amount of aqueous sodium hydroxide solution is added that a pH of about 8.5 is set up. 20 parts of 1,3,4-trichlorbutene-(2) are gradually added at 0° C. while stirring, the mixture is allowed to warm up to room temperature and after some time a pH of about 7 is set up in the mixture by adding 10% aqueous sodium carbonate solution. By occasional further addition of 10% aqueous sodium carbonate solution, the mixture is kept at the same pH until the latter no longer changes without the addition of sodium carbonate solution. Then the alcohol is distilled off from the reaction mixture under reduced pressure, 250 parts of saturated aqueous sodium chloride solution are added to the residue and the deposited reaction product is filtered off. After drying under reduced pressure, a water-soluble dye is obtained which dies cotton turquoise blue shades of excellent fastness.

By using 1,4-dichlorbutene-(2), 1,4-dichlorbutine-(2), benzene-1-sulfonic acid-(4-chlorbutin-(2)-yl-amide)-3- or -4-carboxylic acid chloride or 2-(4-chlorbutine-(2)-amino-1-) 4,6-dichlor-1,3,5-triazine instead of 1,3,4-trichlorbutene-(2), or the corresponding nickel, cobalt, chromium, molybdenum, zinc, aluminum or metal-free compound instead of the copper phthalocyanine compound of the above formula, dyes with similar properties are obtained.

A cotton fabric is padded with an aqueous solution which contains, in 1000 parts by volume, 20 parts of the dye from paragraph 1 of this example and 20 parts of sodium hydrogen carbonate, the fabric is squeezed out, steamed for eight minutes at 100° C. and rinsed and soaped. A powerful turquoise blue dyeing of very good wet fastness is obtained.

*Example 2*

A mixture of 65 parts of monochlor copper phthalocyanine and 600 parts of chlorsulfonic acid is heated for three hours at 130° to 135° C. After cooling, the mixture is stirred into ice-water, the reaction product filtered off and washed with ice-water. 440 parts of the still moist reaction product are made into a paste with 300 parts of ice and a solution of 40 parts of the hydrochloride of 1-amino-3,4-dichlorbutene-(2) in 200 parts of water, such an amount of saturated aqueous sodium acetate solution is added to this paste that a pH of about 5 is set up, and the mixture is stirred at room temperature until the pH no longer changes without addition of sodium acetate solution. Excess sodium chloride is then added, the dye formed filtered off and dried under reduced pressure at 40° to 45° C. It dissolves in water with a turquoise blue color.

Similar dyes which dissolve in water with greenish turquoise blue color are obtained in the same way by using dichlor copper phthalocyanine, tetrachlor copper phthalocyanine, nickel phthalocyanine or iron phthalocyanine instead of monochlor copper phthalocyanine. When using an aza copper phthalocyanine, prepared from molar amounts of quinolinic acid and phthalic acid in a urea melt, instead of monochlor copper phthalocyanine, reddish turquoise blue dyes are obtained.

A cotton fabric is padded with an aqueous solution containing, in 1000 parts by volume, 20 parts of the dye described in the first paragraph of this example, squeezed out to a moisture content of 80% and dried. Then the fabric is led through a second padding bath which contains, in 1000 parts by volume, 15 parts of sodium hydroxide and 300 parts of sodium sulfate, squeezed out, dried in half an hour at 70° C. or steamed for eight minutes at 100° C. After rinsing and soaping, a turquoise blue dyeing of very good fastness to washing is obtained.

*Example 3*

A solution of 30 parts of the hydrochloride of 1-amino-4-chlorbutine-(2) in 150 parts of water is stirred into an aqueous paste of 250 parts of ice, 250 parts of water and 50 parts of copper phthalocyanine-4,4',4'',4'''-tetrasulfonic acid chloride and a pH of about 7 is set up in the mixture by adding 10% aqueous sodium carbonate solution. The mixture is stirred for several hours at room temperature and, when the pH no longer changes without the addition of sodium carbonate solution, such an amount of hydrochloric acid is added that a pH of 2 to 3 is set up. The deposited dye is then filtered off and dried under reduced pressure at a low temperature. In the presence of basic-reacting substances, it gives on cotton blue dyeings of excellent fastness.

Blue dyes with similar properties are obtained by using copper phthalocyanine-3,3',3'',3'''- or -3,3',4'',4'''-tetrasulfonic acid instead of copper phthalocyanine-4,4',4'', 4'''-tetrasulfonic acid chloride and/or 22, 15 or 10 parts of the hydrochloride of 1-amino-4-chlorbutine-(2) instead of 30 parts.

*Example 4*

370 parts of an aqueous paste which contains 100 parts of copper phthalocyanine-3,3',3'',3'''-tetrasulfonic acid chloride are made into a paste with 250 parts of ice and then a suspension which has been obtained by stirring 65 parts of the hydrochloride of 1-(4-aminobenzenesulfonylamino)-3,4-dichlorbutene into 650 parts of hot water and cooling this mixture to 0° C. are added to this paste. By adding saturated aqueous sodium acetate solution, a pH of 5 is set up in the reaction mixture and maintained while stirring the mixture for several hours until it no longer changes without adding sodium acetate solution. The dye formed is precipitated with excess sodium chloride, filtered off and dried under reduced pressure at about 45° C. 165 parts of a water-soluble dye are obtained which dyes cotton in the presence of basic-reacting substances blue shades of good fastness to washing.

Silimar dyes are obtained by reacting copper phthalocyanine-3,3',3'',3'''-tetrasulfonic acid chloride with the amines or hydrochlorides of the amines in the following table:

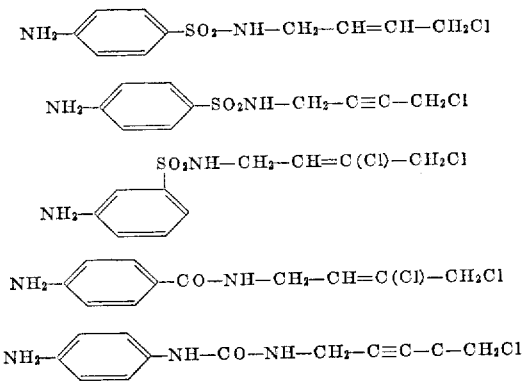

*Example 5*

A solution of 25 parts of the hydrochloride of 1-amino-3,4-dichlorbutene-(2) in 400 parts of tetrahydrofurane is added while stirring to a paste of 40 parts of a mixture of copper phthalocyanine di- and tri-sulfonic acid chlorides. Such an amount of dilute aqueous sodium hydroxide solution, saturated aqueous sodium carbonate solution or saturated aqueous sodium hydrogen carbonate solution is added to this mixture that a pH of about 7 is set up. The mixture is then acidified slightly with dilute hydrochloric acid and the dye formed is filtered off and dried under reduced pressure at a low temperature.

20 parts of this dye are stirred with 100 parts of pyridine and this mixture is left at room temperature or moderately elevated temperature until a sample thereof dissolves completely in water. Then acetone is added to the reaction mixture and the deposited dye filtered off and dried.

The dye dissolves in water with a turquoise blue color and dyes cotton in the presence of basic-reacting substances turquoise blue shades of good fastness to washing.

In an analogous way a reddish blue dye is obtained by using tetramethyltetrazadibenzo-nickel porphin sulfonic acid chloride instead of copper phthalocyanine di- or tri-sulfonic acid chloride and turquoise to greenish blue dyes by using copper phthalocyanine tris-(methylenethioacetic acid chloride), tetra-kis-(methylenethiobutyric acid chloride), tris-(methylenehydroxybenzoic acid chloride) or the phthalocyanine derivative of the following formula:

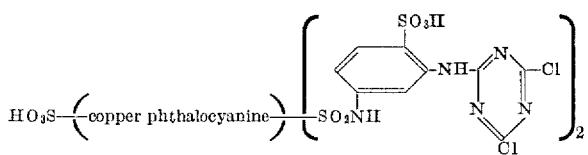

10 parts of the dye from the first paragraph of this example and 50 parts of tetramethyl thiourea are heated for several hours at 100° C. The reaction mixture is then stirred with acetone or taken up in water and salted out. The dye precipitate is filtered off and dried at a low temperature. A water-soluble blue dye is obtained.

*Example 6*

A mixture of 15 parts of tetrakis-chlormethyl copper phthalocyanine, 15 parts of 1-amino-3-hydroxybenzene and 150 parts of sulfuric acid monohydrate is gradually heated to 100° C. and the mixture kept at 100° to 110° C. for several hours. Then a solution of 7 parts of sulfur trioxide in 30 parts of sulfuric acid is added and the mixture is heated for another two to three hours at 120° C. The mixture is allowed to cool, poured onto ice and the reaction product filtered off.

The whole of the filter residue, while still moist, is dissolved with such an amount of dilute aqueous sodium hydroxide solution that the solution has a pH of about 8, and at 0° C. a solution of 28 parts of 1,3,4-trichlorbutene-(2) in 200 parts of methanol is added with stirring. The pH of the mixture is kept at about 7 by adding saturated aqueous sodium carbonate solution and the mixture stirred at room temperature until the pH of the solution no longer changes without the addition of sodium carbonate solution. Such an amount of dilute hydrochloric acid is added that a pH of about 4 is set up in the mixture and the dye formed is precipitated with excess potassium chloride. After filtering and drying under reduced pressure, a water-soluble dye is obtained which dyes cotton in the presence of basic-reacting substances greenish blue shades of excellent wet fastness.

Instead of tetrakis-(chlormethyl)-copper phthalocyanine it is also possible to use bis- or tris-chlormethyl-copper or -nickel phthalocyanine, and/or instead of 1-amino-3-hydroxybenzene, 1-amino-2- or -4-hydroxybenzene.

Similar dyes are obtained by reacting in the way described in paragraph 2 of this example tetrakis-amino copper phthalocyanine tetrasulfonic acid, bis-(aminomethyl) copper phthalocyanine disulfonic acid or the phthalocyanine derivatives of the following table with 1,3,4-trichlorbutene-(2), 2- or 4-chlorbutine-(2)-amino-4,6-dichlor-1,3,5-triazine or 1,4-dibromobutine-(2):

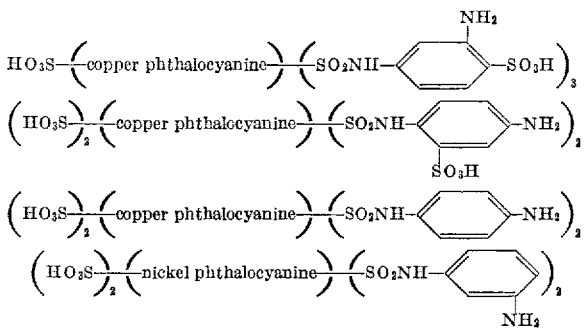

*Example 7*

50 parts of copper phthalocyanine tetrasulfonic acid chloride, 200 parts of water and 200 parts of ice are stirred well and then neutralized with 10% aqueous caustic soda solution. A solution of 22 parts of the hydrochloride of 1-(4-aminophenoxy)-3,4-dichlorbutene-(2) in 110 parts of water, which has previously been adjusted to a pH of 1 with dilute hydrochloric acid, is added and, in the course of two hours, a solution of 136 parts of crystallized sodium acetate in 150 parts of water is added and the mixture stirred for 20 hours at room temperature. The reaction product is filtered off and dried under reduced pressure at 35° C. About 65 parts of a dye are obtained which in the presence of basic-reacting agents dyes cotton turquoise blue shades fast to wet treatment.

By using the corresponding nickel compound instead of copper phthalocyanine tetrasulfonic acid chloride, and the hydrochloride of 1-(3-aminophenoxy)-3,4-dichlorbutene-(2), 1-(4-aminophenoxy)-4-chlorbutine-(2) or 1-(3-aminophenoxy)-4-chlorbutine-(2) instead of 1-(4-aminophenoxy)-3,4-dichlorbutene-(2), a blue-green dye of similar properties is obtained.

The hydrochlorides of 1-(4-aminophenoxy)-3,4-dichlorbutene-(2) and of the 1-(4-aminophenoxy)-4-chlorbutine-(2) specified in the next example are obtained by reaction of 1-hydroxy-4-acetylaminobenzene with the corresponding halogen compounds and subsequent splitting off of the acetyl group in the usual way.

*Example 8*

30 parts of monochlor copper phthalocyanine are heated in 250 parts of chlorsulfonic acid for an hour at 120° C. and five hours at 130° C. The solution is poured onto ice, filtered off and the residue washed with cold water until the filtrate is colored pale blue. The filter residue is made into a paste with 100 parts of water and 200 parts of ice and neutralized with 10% caustic soda solution. To this mixture is added a hydrochloric acid solution of 14 parts of the hydrochloride of 1-(4-aminophenoxy)-4-chlorbutine-(2) in 100 parts of water and a solution of 50 parts of crystallized sodium acetate in 50 parts of water. By adding a 10% aqueous sodium carbonate solution in small portions, the reaction mixture is kept at a pH of 6.0 to 6.4 for 24 hours at room temperature. Then 100 parts of potassium chloride are added, the reaction product is filtered off and dried at room temperature under reduced pressure. A water-soluble turquoise blue dye is obtained.

*Example 9*

30 parts of tetraphenyl copper phthalocyanine are introduced while stirring into 300 parts of chlorsulfonic acid and gradually heated to 120° C. The solution is kept at 120° C. for about an hour and then heated for five hours at 130° to 135° C. After cooling, the solution is poured onto 2000 parts of ice, the product filtered off and washed with ice-water. The still moist filter residue is made into a paste with 200 parts of ice and a solution of 14 parts of the hydrochloride of 1-amino-4-chlorbutine-(2) in 50 parts of water added at about 0° C. The mixture is stirred for some hours at 0° to +5° C., allowed to warm up to room temperature and stirred for about 12 hours at 25° to 35° C. By gradual addition of 180 to 200 parts of an about 10% aqueous sodium carbonate solution, the whole is kept at a pH of about 6 to 7 during the reaction. The reaction product is filtered off and dried under reduced pressure at about 35° C. The dye is thus obtained in a yield of about 60 parts.

A cotton fabric is padded with an aqueous solution which contains, in 1000 parts by volume, 20 parts of the said dye and 10 parts by volume of an aqueous sodium hydroxide solution (38° Baumé), the fabric squeezed out, steamed for eight minutes at 100° C. and rinsed and soaped. A powerful green dyeing is obtained with very good wet and light fastness.

By using 19 or 10 parts of the hydrochloride of 1-amino-4-chlorbutine-(2) instead of 14 parts of this compound, or tetraphenyl nickel phthalocyanine instead of tetraphenyl copper phthalocyanine, green dyes with similar properties are obtained by following the procedure of paragraph 1 of this example.

*Example 10*

50 parts of tetrakis-(phenylmercapto)-copper phthalocyanine are heated in 500 parts of chlorsulfonic acid for four hours at 90° to 100° C. and for an hour at 120° C. The sulfochlorination product is isolated in the usual way and the moist filtered material made into a paste with 300 parts of ice and a solution of 20 parts of the hydrochloride of 1-amino-4-chlorbutine-(2) in 50 parts of water. By adding concentrated aqueous sodium carbonate solution, the mixture is kept first at 0° to +5° C., later at about 25° to 35° C. at a weakly acid to neutral pH and after a reaction period of 20 hours the dye is filtered off. It is dehydrated by washing with isopropyl alcohol and dried in the air. About 85 parts of dye are thus obtained.

A cotton fabric is padded with a solution which contains in 100 parts 2 parts of the said dye, 20 parts of urea and 2 parts of sodium carbonate, pressed out, dried at 80° C. and the fabric then treated for five to eight minutes with hot air at 140° C. After rinsing and soaping at the boil, a green-wet-fast dyeing is obtained.

By using dyes which have been obtained from tetraphenyl copper phthalocyanine or tetraphenylsulfonyl copper phthalocyanine in the way described in the first paragraph of this example, instead of the said dye, green and turquoise dyeings of pure shade are obtained.

Example 11

A suspension of 39 parts of copper phthalocyanine disulfonic acid chloride in 200 parts of ice-water is stirred at 0° to +5° C. for two to three hours with a solution of 32 parts of the compound of the formula:

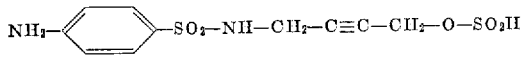

and 4 parts of sodium hydroxide in 200 parts of water. By adding small amounts of sodium hydrogen carbonate, the pH of the mixture is kept at about 7. Then the temperature is allowed to rise to 20° to 30° C. and after a further reaction period of about 10 hours the dye is salted out, filtered off and dried under reduced pressure at 35° C. A water-soluble turquoise-blue dye is thus obtained.

Equivalent amounts of 1-aminobutine-(2)-ol-4-sulfuric acid ester or of 1-aminobutene-(2)-ol-4-sulfuric acid ester may be reacted in an analogous way instead of the compound of the above formula, similar results being obtained.

Example 12

34 parts of diphenyl copper phthalocyanine tetrasulfonic acid chloride, 20 parts of the hydrochloride of 1-amino-4-chlorbutine-(2), 6 parts of sodium hydrogen carbonate, 150 parts of water and 150 parts of ice are stirred intensively and the mixture is kept weakly acid to neutral by adding a saturated aqueous sodium hydrogen carbonate solution. The temperature is allowed to rise gradually to 20° to 25° C. and further stirred for another 12 hours. Then the dye is filtered off and dried. A dye is obtained which dyes cotton blue-green shades fast to light and to wet treatment.

Similar greenish blue to bluish green dyes are obtained by reacting the tetrasulfonic acid chlorides of di-(phenylsulfonyl)-, di-(phenylmercapto)-mono- or -triphenyl copper or nickel phthalocyanine in equivalent amounts instead of diphenyl copper phthalocyanine tetrasulfonic acid chloride or by using corresponding amounts of 1-amino-4-chlorbutene-(2), 1-amino-3,4-dichlorbutene-(2) or 1-amino-2,3-dimethyl-4-bromobutene-(2) or their hydrohalides instead of the hydrochloride of 1-amino-4-chlorbutine-(2).

We claim:
1. A phthalocyanine dyestuff of the formula:

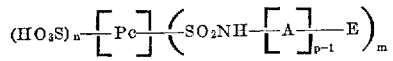

wherein:
Pc represents a member selected from the group consisting of copper phthalocyanine, nickel phthalocyanine, mono-, di-, tri- and tetrachlorocopper phthalocyanine, mono-, di-, tri- and tetraphenylcopper phthalocyanine, di- and tetraphenylmercaptocopper phthalocyanine, and metal free phthalocyanine;

A represents a divalent radical selected from the class consisting of

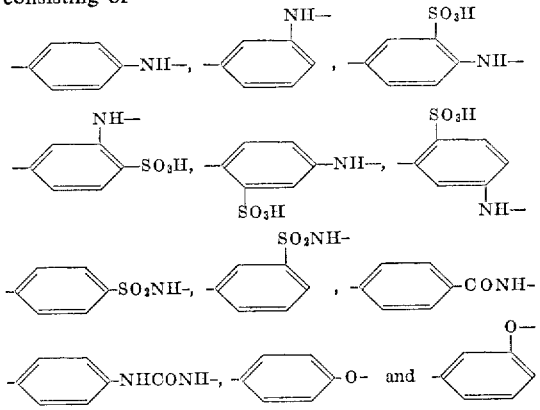

E represents a monovalent radical selected from the class consisting of

—CH₂—CH=CH—CH₂Cl

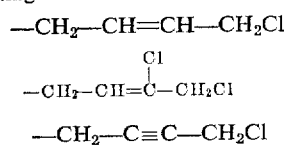

and

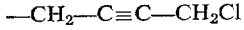

n and m each represents one of the integers 1, 2, 3 and 4 and the total of n and m is not more than 6; and p is one of the integers 1 and 2.

2. A dyestuff of the formula:

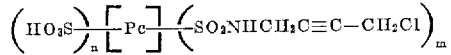

Pc represents a member selected from the group consisting of copper phthalocyanine, nickel phthalocyanine, mono-, di-, tri- and tetrachlorocopper phthalocyanine, mono-, di-, tri- and tetraphenylcopper phthalocyanine, di- and tetraphenylmercaptocopper phthalocyanine and metal-free phthalocyanine; and n and m each represents one of the integers 1, 2, 3 and 4 and the total of n and m is not more than 6.

3. The dye of the formula:

HO₃S—[copperphthalocyanine]—(SO₂NHCH₂—C≡C—CH₂Cl)₃

4. The dye of the formula:

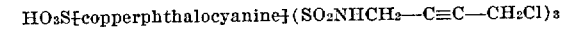
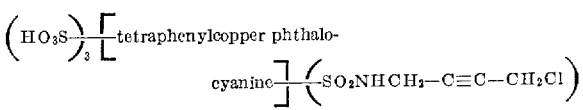

References Cited in the file of this patent

UNITED STATES PATENTS

| | | |
|---|---|---|
| 2,494,524 | Sprague | Jan. 10, 1950 |
| 2,561,948 | Rawlins | July 24, 1951 |
| 2,683,643 | Baumann et al. | July 13, 1954 |
| 2,768,867 | Baumann et al. | Oct. 30, 1956 |
| 2,903,450 | Long et al. | Sept. 8, 1959 |
| 2,915,392 | Pederson | Dec. 1, 1959 |
| 2,950,286 | Miller et al. | Aug. 23, 1960 |
| 2,954,405 | Hock et al. | Sept. 27, 1960 |
| 2,957,004 | Perkins et al. | Oct. 18, 1960 |
| 2,973,358 | Pugin | Feb. 28, 1961 |

FOREIGN PATENTS

| | | |
|---|---|---|
| 1,239,052 | France | July 11, 1960 |

OTHER REFERENCES

Lubs, Chemistry of Synthetic Dyes and Pigments, pp. 582–3, Reinhold Publishing Corp. (1955).

Chemical Abstracts, vol. 54, No. 17 (1960), p. 17897.

UNITED STATES PATENT OFFICE
CERTIFICATE OF CORRECTION

Patent No. 3,096,340            July 2, 1963

Arnold Tartter et al.

It is hereby certified that error appears in the above numbered patent requiring correction and that the said Letters Patent should read as corrected below.

Column 1, lines 49 to 51, for "-SO$_2$-NH-SO-NH-" read -- -SO$_2$-NH-SO$_2$-NH- --; column 2, line 22, for "-CH$_2$-C≡CH$_2$-" read -- -CH$_2$-C≡C-CH$_2$- --; column 3, lines 66 to 68, for 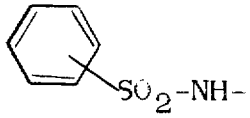SO$_2$-NH- read 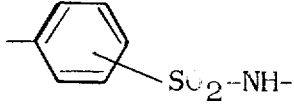SO$_2$-NH- column 5, line 34, for "an" read -- and --; column 12, line 54, for ")" read -- )$_3$ --.

Signed and sealed this 12th day of May 1964.

(SEAL)
Attest:

ERNEST W. SWIDER            EDWARD J. BRENNER

Attesting Officer            Commissioner of Patents